B. F. CLINE.
FASTENER FOR AUTOMOBILE HOODS.
APPLICATION FILED MAY 8, 1918.

1,273,332. Patented July 23, 1918.

WITNESS
George C. Myers.

INVENTOR
BENJAMIN F. CLINE,
BY
ATTORNEYS

UNITED STATES PATENT OFFICE.

BENJAMIN FREDERICK CLINE, OF ORANGE, NEW JERSEY.

FASTENER FOR AUTOMOBILE-HOODS.

1,273,332.   Specification of Letters Patent.   Patented July 23, 1918.

Application filed May 8, 1918. Serial No. 233,334.

*To all whom it may concern:*

Be it known that I, BENJAMIN F. CLINE, a citizen of the United States, and a resident of Orange, in the county of Essex and State of New Jersey, have invented certain new and useful Improvements in Fasteners for Automobile-Hoods, of which the following is a specification.

My invention is an improvement in fasteners for automobile hoods, and has for its object to provide a simple, easily operated, inexpensive device of the character specified, by means of which, with a single movement, the hood may be locked or unlocked at both ends.

Figure 1:
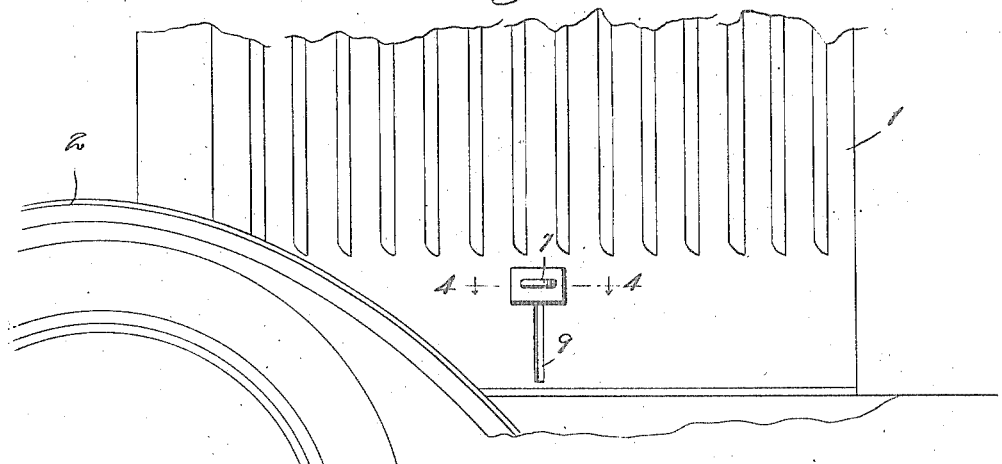
Figure 1 is a partial side view of a motor vehicle, having the improved fastener.

The present embodiment of the invention is shown in connection with the hood 1 of a motor vehicle indicated at 2, and the improvement comprises a pair of bolts 3 which are mounted to slide in bearings 4 on the inner face of the hood near each end thereof. Each of these bolts is adapted to engage a keeper 5 on the frame 6 of the automobile, to lock the hood and the frame at the end of the hood or near each end thereof.

A handle member, consisting of an eye or handle 7 and a shank 8, is mounted to slide in a vertical slot 9 in the side wall of the hood. Links 10 connect the inner end of the shank of the handle with the bolts 3. One of these links 10, as shown in Fig. 4, has a pair of lugs at the end adjacent to the handle, between which is received a single lug on the other link, and the shank is headed, as shown, to hold the links in place.

A pair of plates 11 is supported by the handle, one of the said plates being on the inner face of the hood and the other on the outer face, and these plates have an opening through which the shank extends. The plates are slidable on the hood with the handle, and coil springs 12 are arranged between the grip portion 7 of the handle and the outermost plate 11.

Figure 4:
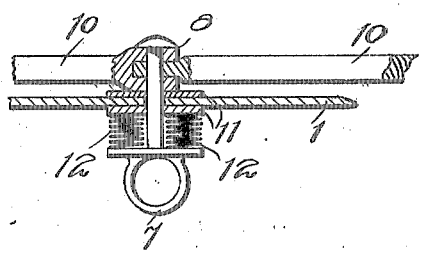
Fig. 4 is a section on the line 4—4 of Fig. 1, looking in the direction of the arrows adjacent to the line.

As will be noticed from an inspection of Fig. 4, the grip portion of the handle is of considerable length, and two springs 12 are provided, one at each end of the grip. These springs normally press the handle outwardly, holding the links 10 in close contact with the inner surface of the hood.

Figure 2:
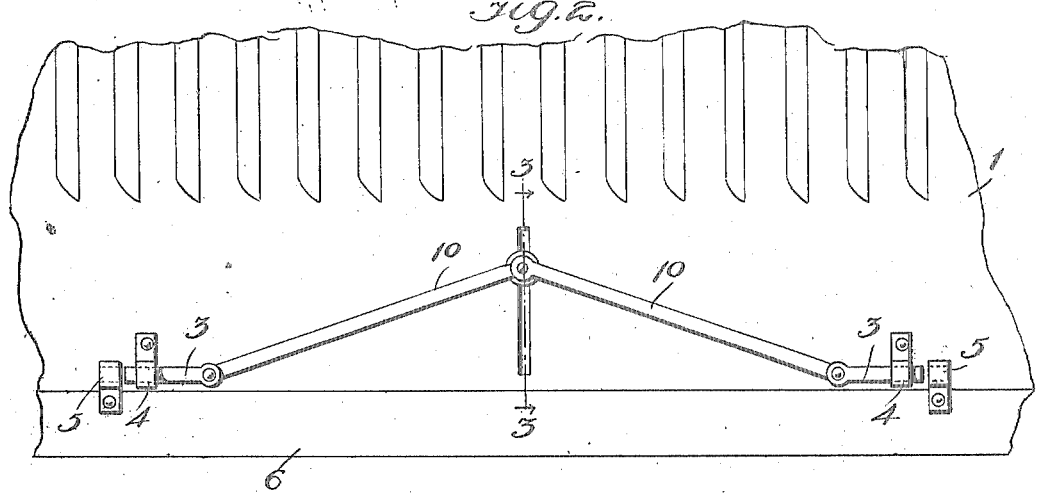
Fig. 2 is a view from the inside.
Figure 3:
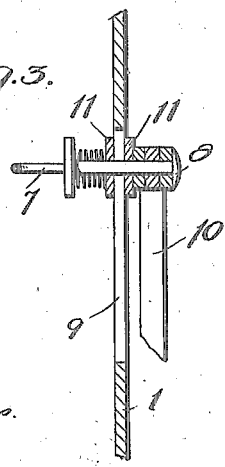
Fig. 3 is a section on the line 3—3 of Fig. 2, looking in the direction of the arrows adjacent to the line.

In operation, with the parts in the position of Figs. 1 and 2, that is, with the bolts in withdrawn position and the hood unlocked, when it is desired to lock the hood, the handle 7—8 is grasped and moved downwardly in the slot 9. This movement causes the links 10 to press the bolts 3 away from each other into engagement with the keepers 5 and the hood is locked.

To unlock the hood it is only necessary to reverse this movement and there is sufficient friction between the parts to hold the handle in unlocked position until it is desired to again unlock the same. The springs also prevent rattling of the parts, making the device operate smoothly and noiselessly.

The movement of unlocking the hood is precisely the same movement as is used in lifting the hood, and the continuation of the unlocking movement will lift the hood. The same is true in regard to closing the hood. All of the device is installed on the inside of the hood, with the exception of the handle.

When the driver desires to inspect the engine, all that is necessary is to lift the handle as though there were no locks attached, and the hood will move up in a continuous movement. In replacing the hood the same is true.

I claim:

In an automobile, the combination with the hood and the frame of the vehicle, of means for locking the same to the frame, said means comprising bolts mounted to slide on the inner face of the hood at the opposite ends thereof and in opposite directions, a keeper on the frame for engagement by each bolt, a handle mounted to slide vertically in the hood wall, said wall having a vertical slot and the handle having a shank extending through the slot, links connecting the shank with the bolts, plates on the shank on opposite sides of the hood, and springs between the handle and the outermost plate for pressing said handle outward, the lifting movement of the handle serving to open the bolts.

BENJAMIN FREDERICK CLINE.

Signed in the presence of—
J. G. TRUSDELL MOORE,
G. M. McCOLLUM.